US012596702B1

(12) United States Patent
Chen et al.

(10) Patent No.: US 12,596,702 B1
(45) Date of Patent: Apr. 7, 2026

(54) METADATA-BASED IMAGE ORIGINATION CHECKER

(71) Applicant: Jumio Corporation, Sunnyvale, CA (US)

(72) Inventors: Yanying Chen, Knoxville, TN (US); Alix Melchy, Montreal (CA)

(73) Assignee: Jumio Corporation, Sunnyvale, CA (US)

( * ) Notice: Subject to any disclaimer, the term of this patent is extended or adjusted under 35 U.S.C. 154(b) by 0 days.

(21) Appl. No.: 18/615,898

(22) Filed: Mar. 25, 2024

(51) Int. Cl.
*G06F 16/23* (2019.01)
*G06F 16/583* (2019.01)

(52) U.S. Cl.
CPC ........ *G06F 16/2365* (2019.01); *G06F 16/583* (2019.01)

(58) Field of Classification Search
CPC ........................... G06F 16/2365; G06F 16/583
See application file for complete search history.

(56) References Cited

U.S. PATENT DOCUMENTS

2021/0233204 A1* 7/2021 Alattar .................. G10L 19/018
2023/0005122 A1* 1/2023 Peng ...................... G06N 3/045
2024/0127630 A1* 4/2024 Michaeli ................ G06V 20/46

* cited by examiner

*Primary Examiner* — Clayton R Williams
(74) *Attorney, Agent, or Firm* — Patent Law Works LLP

(57) ABSTRACT

The disclosure includes a system and method for extracting, using one or more processors, metadata from a first media file, wherein the metadata is distinct from media content; encoding, using the one or more processors, a first portion of the metadata extracted from the first media file into a first metadata-encoded media signature; and determining, using the one or more processors, whether the first metadata-encoded media signature is indicative a defect.

20 Claims, 11 Drawing Sheets

400

EXTRACT METADATA ASSOCIATED WITH THE FIRST MEDIA 402

GENERATE ONE OR MORE METADATA-ENCODED MEDIA SIGNATURES BASED ON THE EXTRACTED METADATA 404

DETERMINE, BASED ON THE ONE OR MORE METADATA-ENCODED MEDIA SIGNATURES, WHETHER THE FIRST MEDIA IS DEFECT FREE 406

200

400

EXTRACT METADATA ASSOCIATED WITH THE FIRST
MEDIA 402

GENERATE ONE OR MORE METADATA-ENCODED MEDIA
SIGNATURES BASED ON THE EXTRACTED METADATA
404

DETERMINE, BASED ON THE ONE OR MORE METADATA-
ENCODED MEDIA SIGNATURES, WHETHER THE FIRST
MEDIA IS DEFECT FREE  406

404

ENCODE METADATA FIELD DATA INTO FIRST
SIGNATURE  502

ENCODE METADATA VALUE DATA INTO FIRST
SIGNATURE 504

406

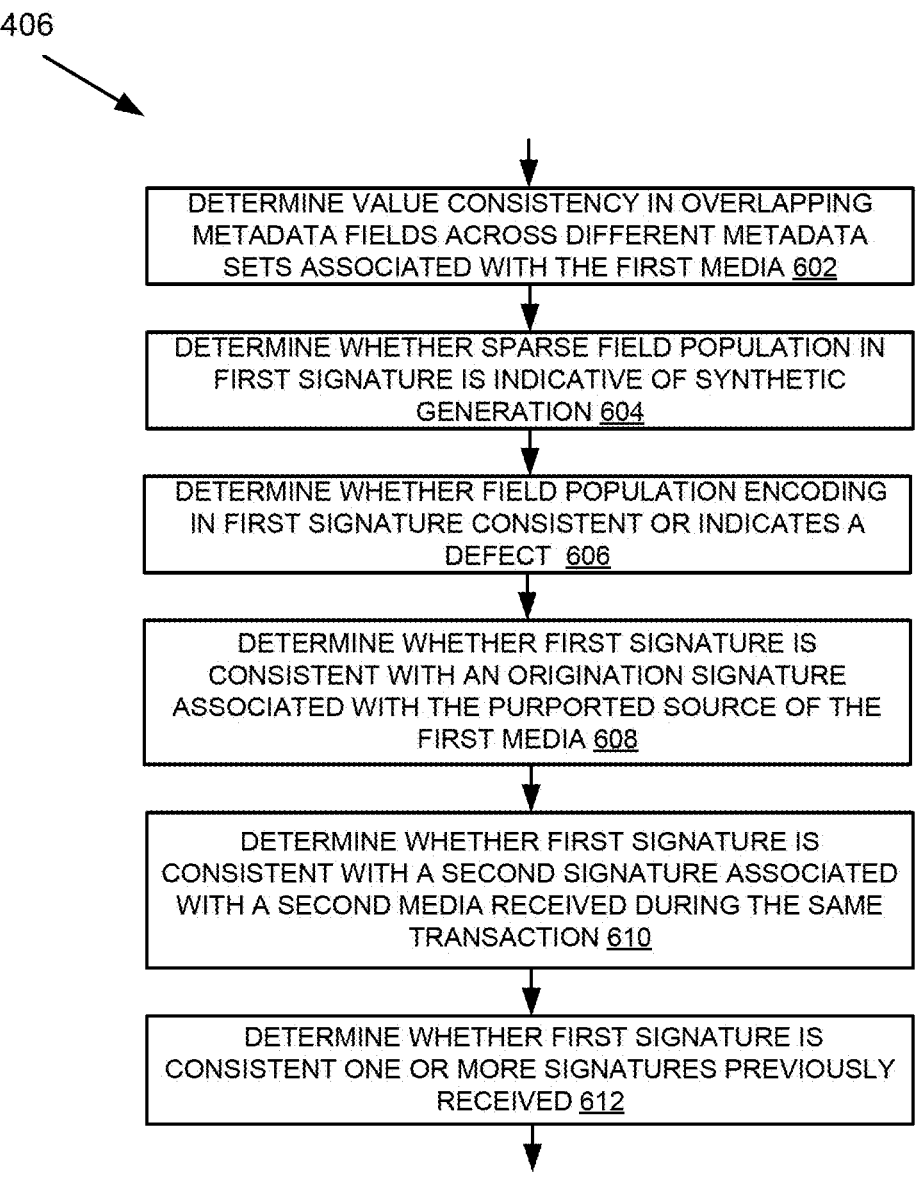

DETERMINE VALUE CONSISTENCY IN OVERLAPPING METADATA FIELDS ACROSS DIFFERENT METADATA SETS ASSOCIATED WITH THE FIRST MEDIA 602

DETERMINE WHETHER SPARSE FIELD POPULATION IN FIRST SIGNATURE IS INDICATIVE OF SYNTHETIC GENERATION 604

DETERMINE WHETHER FIELD POPULATION ENCODING IN FIRST SIGNATURE CONSISTENT OR INDICATES A DEFECT 606

DETERMINE WHETHER FIRST SIGNATURE IS CONSISTENT WITH AN ORIGINATION SIGNATURE ASSOCIATED WITH THE PURPORTED SOURCE OF THE FIRST MEDIA 608

DETERMINE WHETHER FIRST SIGNATURE IS CONSISTENT WITH A SECOND SIGNATURE ASSOCIATED WITH A SECOND MEDIA RECEIVED DURING THE SAME TRANSACTION 610

DETERMINE WHETHER FIRST SIGNATURE IS CONSISTENT ONE OR MORE SIGNATURES PREVIOUSLY RECEIVED 612

| | iPhone Photo | iPhone Photo | Samsung Galaxy Photo | Samsung Galaxy Photo | Samsung Galaxy Photo 2 | Google Pixel 6 Photo | Google Pixel 6 Photo |
|---|---|---|---|---|---|---|---|
| | 1 | 2 | 1 | 1 | 2 | 1 | 2 |
| mime_type | image/jpeg | image/jpeg | image/jpeg | image/jpeg | image/jpeg | image/jpeg | image/jpeg |
| pixel_width from Media Content Data | 4032 | 4032 | 4032 | 4032 | 4032 | 4080 | 3072 |
| pixel_height from Media Content Data | 3024 | 3024 | 1960 | 1960 | 1960 | 3072 | 4080 |
| Exif.Image.Orientation | 6 | 6 | 6 | 6 | 6 | 1 | 1 |
| Exif.Image.XResolution | [72, 1] | [72, 1] | [72, 1] | [72, 1] | [72, 1] | [72, 1] | [72, 1] |
| Exif.Image.YResolution | [72, 1] | [72, 1] | [72, 1] | [72, 1] | [72, 1] | [72, 1] | [72, 1] |
| Exif.Image.ResolutionUnit | 2 | 2 | 2 | 2 | 2 | 2 | 2 |
| Exif.Image.YCbCrPositioning | 1 | 1 | 1 | 1 | 1 | 1 | 1 |
| Exif.Image.ExifTag | 102 | 102 | 238 | 238 | 238 | 218 | 218 |
| Exif.Photo.ExifVersion | 48 50 50 48 | 48 50 50 48 | 48 50 50 48 | 48 50 50 48 | 48 50 50 48 | 48 50 51 50 | 48 50 51 50 |
| Exif.Photo.ComponentsConfiguration | 1 2 3 0 | 1 2 3 0 | 1 2 3 0 | 1 2 3 0 | 1 2 3 0 | 1 2 3 0 | 1 2 3 0 |
| Exif.Photo.FlashpixVersion | 48 49 48 48 | 48 49 48 48 | 48 49 48 48 | 48 49 48 48 | 48 49 48 48 | 48 49 48 48 | 48 49 48 48 |
| Exif.Photo.ColorSpace | 1 | 1 | 1 | 1 | 1 | 1 | 1 |
| Exif.Photo.PixelXDimension | 4032 | 4032 | 4032 | 4032 | 4032 | 4080 | 3072 |
| Exif.Photo.PixelYDimension | 3024 | 3024 | 1960 | 1960 | 1960 | 3072 | 4080 |
| Exif.Photo.SceneCaptureType | 0 | 0 | 0 | 0 | 0 | 0 | 0 |
| Exif.Thumbnail.Compression | 6 | 6 | 6 | 6 | 6 | 6 | 6 |
| Exif.Thumbnail.XResolution | [72, 1] | [72, 1] | [72, 1] | [72, 1] | [72, 1] | [72, 1] | [72, 1] |
| Exif.Thumbnail.YResolution | [72, 1] | [72, 1] | [72, 1] | [72, 1] | [72, 1] | [72, 1] | [72, 1] |
| Exif.Thumbnail.ResolutionUnit | 2 | 2 | 2 | 2 | 2 | 2 | 2 |
| Exif.Thumbnail.JPEGInterchangeFormat | 286 | 286 | 6840 | 6840 | | 1108 | 1108 |
| Exif.Thumbnail.JPEGInterchangeFormatLength | 2826 | 5785 | 7361 | 7295 | 11142 | 16590 | |
| Exif.Image.ImageWidth | | | | | | | |
| Exif.Image.ImageLength | | | | | | | |
| Exif.Image.Make | | | samsung | samsung | samsung | Google | Google |
| Exif.Image.Model | | | SM-G950U | SM-G950U | SM-G950U | Pixel 6 | Pixel 6 |
| Exif.Image.Software | | | G950USQU6DUD3 | G950USQU6DUD3 | G950USQU6DUD3 | HDR+ | HDR+ |
| | | | | | | 1.0.58508440.1tzd | 1.0.58508440.1tzd |
| Exif.Image.DateTime | | | 2023:12:15 18:33:28 | 2023:12:15 18:33:28 | 2023:12:15 17:08:49 | 2023:12:15 23:32:15 | 2024:01:08 19:12:25 |
| Exif.Photo.ExposureTime | | | [1, 10] | [1, 10] | [1, 24] | [1097, 1000000] | [6530, 1000000] |
| Exif.Photo.FNumber | | | [170, 100] | [170, 100] | [170, 100] | [185, 100] | [185, 100] |
| Exif.Photo.ExposureProgram | | | 2 | 2 | 2 | 2 | 2 |
| Exif.Photo.ISOSpeedRatings | | | 640 | 640 | 50 | 1546 | 105 |
| Exif.Photo.DateTimeOriginal | | | 2023:12:15 18:33:28 | 2023:12:15 18:33:28 | 2023:12:15 17:08:49 | 2023:12:15 23:32:15 | 2024:01:08 19:12:25 |
| Exif.Photo.DateTimeDigitized | | | 2023:12:15 18:33:28 | 2023:12:15 18:33:28 | 2023:12:15 17:08:49 | 2023:12:15 23:32:15 | 2024:01:08 19:12:25 |
| Exif.Photo.ShutterSpeedValue | | | [3317, 1000] | [3317, 1000] | [7058, 1000] | [4157, 100] | [891, 100] |

Figure 8A

| Field | Value 1 | Value 2 | Value 3 | Value 4 |
|---|---|---|---|---|
| Exif.Photo.ApertureValue | [153, 100] | [153, 100] | [178, 100] | [178, 100] |
| Exif.Photo.BrightnessValue | [272, 100] | [527, 100] | [265, 100] | [381, 100] |
| Exif.Photo.ExposureBiasValue | [0, 10] | [0, 10] | [0, 6] | [0, 6] |
| Exif.Photo.MaxApertureValue | [153, 100] | [153, 100] | [178, 100] | [178, 100] |
| Exif.Photo.MeteringMode | 2 | 2 | 2 | 2 |
| Exif.Photo.LightSource | 0 | 0 | | |
| Exif.Photo.Flash | 0 | 0 | 16 | 16 |
| Exif.Photo.FocalLength | [425, 100] | [425, 100] | [6810, 1000] | [6810, 1000] |
| Exif.Photo.MakerNote | 70107040048 ... | 70107040048 ... | | |
| Exif.Photo.UserComment | charset=Ascii | charset=Ascii | | |
| Exif.Photo.InteroperabilityTag | | | | |
| Exif.Iop.InteroperabilityIndex | R98 | R98 | R98 | R98 |
| Exif.Iop.InteroperabilityVersion | 48 49 48 49 | 48 49 48 49 | 48 49 48 48 | 48 49 48 48 |
| Exif.Photo.SensingMethod | 2 | 2 | 2 | 2 |
| Exif.Photo.SceneType | 1 | 1 | 1 | 1 |
| Exif.Photo.ExposureMode | 0 | 0 | 0 | 0 |
| Exif.Photo.WhiteBalance | 0 | 0 | 0 | 0 |
| Exif.Photo.FocalLengthIn35mmFilm | 28 | 28 | 24 | 24 |
| Exif.Photo.ImageUniqueID | F12QSJA00SM / F12QSKB01SB | F12QSJA00SM / F12QSKB01SB | | |
| Exif.Image.GPSTag | 984 | 984 | 962 | 962 |
| Exif.GPSInfo.GPSVersionID | 2 2 0 0 | 2 2 0 0 | 2 2 0 0 | 2 2 0 0 |
| Exif.GPSInfo.GPSLatitudeRef | N | N | | |
| Exif.GPSInfo.GPSLatitude | [0, 1], [0, 1], [0, 100000] | [35, 1], [57, 1], [52743, 100000] | | |
| Exif.GPSInfo.GPSLongitudeRef | E | W | | |
| Exif.GPSInfo.GPSLongitude | [0, 1], [0, 1], [0, 100000] | [83, 1], [55, 1], [25619, 100000] | | |
| Exif.GPSInfo.GPSAltitudeRef | 0 | 0 | | |
| Exif.GPSInfo.GPSAltitude | [0, 1000] | [72200, 1000] | | |
| Exif.GPSInfo.GPSTimeStamp | [22, 1], [33, 1], [26, 1] | [22, 1], [6, 1], [36, 1] | | |
| Exif.GPSInfo.GPSDateStamp | 2023:12:15 | 2023:12:15 | | |
| Exif.Thumbnail.ImageWidth | 456 | 456 | | |
| Exif.Thumbnail.ImageLength | 240 | 240 | | |
| Exif.Thumbnail.Orientation | 6 | 6 | 1 | 1 |
| Exif.Photo.OffsetTime | | | 5:00:00 | 5:00:00 |
| Exif.Photo.OffsetTimeOriginal | | | 5:00:00 | 5:00:00 |
| Exif.Photo.OffsetTimeDigitized | | | 5:00:00 | 5:00:00 |
| Exif.Photo.SubjectDistance | | | [1726, 100] | [474, 100] |
| Exif.Photo.SubSecTime | | | 929 | 540 |

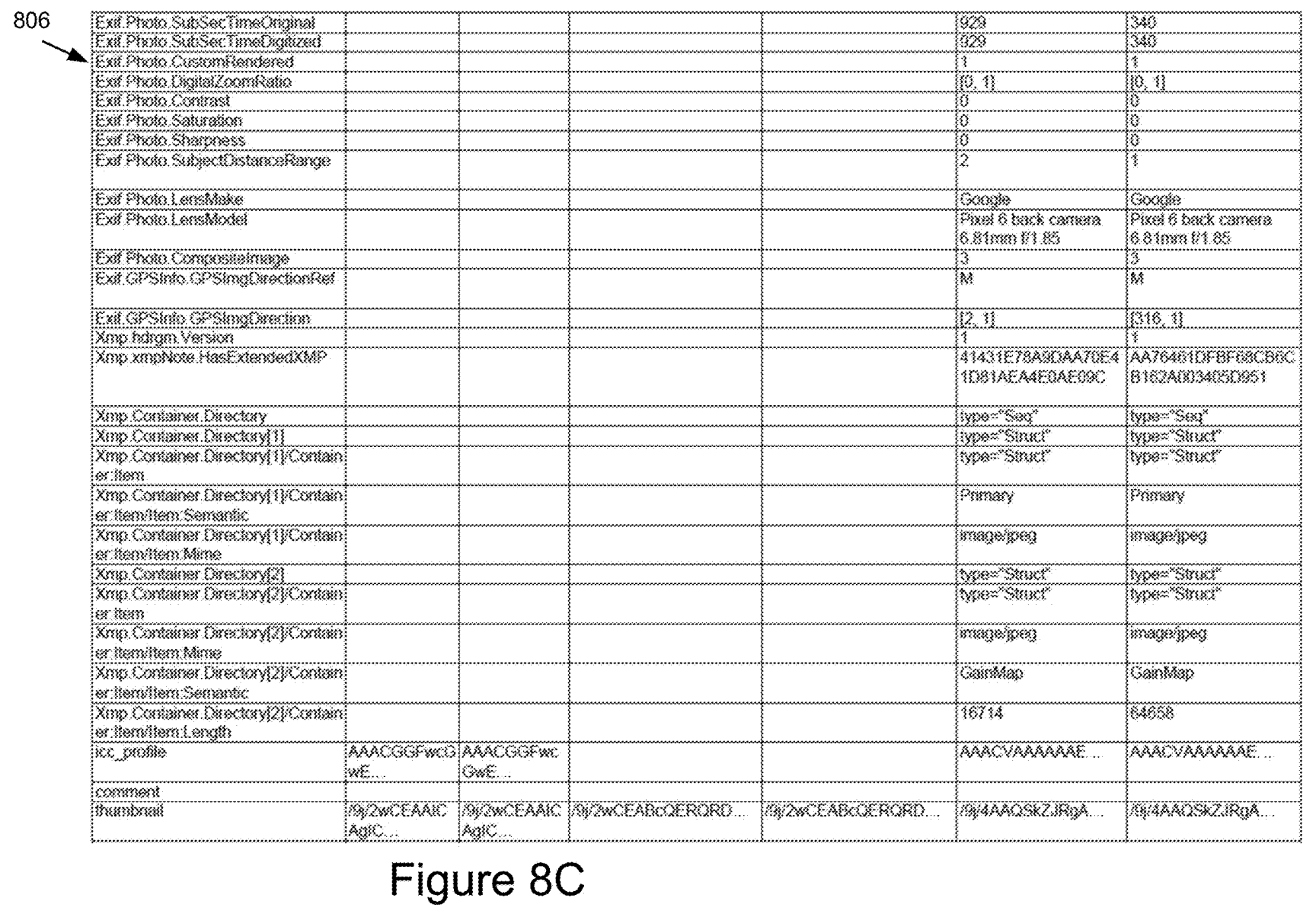

| | | | |
|---|---|---|---|
| Exif.Photo.SubSecTimeOriginal | | 920 | 340 |
| Exif.Photo.SubSecTimeDigitized | | 920 | 340 |
| Exif.Photo.CustomRendered | | 1 | 1 |
| Exif.Photo.DigitalZoomRatio | | [0,1] | [0,1] |
| Exif.Photo.Contrast | | 0 | 0 |
| Exif.Photo.Saturation | | 0 | 0 |
| Exif.Photo.Sharpness | | | |
| Exif.Photo.SubjectDistanceRange | | 2 | 1 |
| Exif.Photo.LensMake | | Google | Google |
| Exif.Photo.LensModel | | Pixel 6 back camera 6.81mm f/1.85 | Pixel 6 back camera 6.81mm f/1.85 |
| Exif.Photo.CompositeImage | | 3 | 3 |
| Exif.GPSInfo.GPSImgDirectionRef | | M | M |
| Exif.GPSInfo.GPSImgDirection | | [2,1] | [16,1] |
| Xmp.hdrgm.Version | | 1 | 1 |
| Xmp.xmpNote.HasExtendedXMP | | 41A1E79A03AA7BE4 1D81AE44EDAE09C | AA7646103FBF68CBKC B162A803446G3951 |
| Xmp.Container.Directory | | type="Set" | type="Set" |
| Xmp.Container.Directory[1] | | type="Struct" | type="Struct" |
| Xmp.Container.Directory[1]/Container:Item | | type="Struct" | type="Struct" |
| Xmp.Container.Directory[1]/Container:Item/Item:Semantic | | Primary | Primary |
| Xmp.Container.Directory[1]/Container:Item/Item:Mime | | image/jpeg | image/jpeg |
| Xmp.Container.Directory[2]/Container:Item | | type="Struct" | type="Struct" |
| Xmp.Container.Directory[2]/Container:Item | | type="Struct" | type="Struct" |
| Xmp.Container.Directory[2]/Container:Item/Item:Semantic | | image/jpeg | image/jpeg |
| Xmp.Container.Directory[2]/Container:Item/Item:Mime | | GainMap | GainMap |
| Xmp.Container.Directory[2]/Container:Item/Item:Length | | 16/14 | 84838 |
| icc_profile | AAACGGFwcG wE... | AAACGGFwc OwE... | AAAC/AAAAAE... | AAAC/AAAAAE... |
| comment | 9j/2wCEAAC AgIC... | | 9j/2wCEAAAC AgIC... | |
| thumbnail | | | 9j/4AAQSkZJRgA... | 9j/4AAQSkZJRgA... |

Figure 8C

METADATA-BASED IMAGE ORIGINATION CHECKER

BACKGROUND

The present disclosure relates to authenticating media metadata, e.g., by determining the presence, or absent, of a defect in the media metadata.

Transactions and interactions are becoming increasingly remote and electronic. Some of those transactions and interactions involve media (e.g., images, video, and audio). However, technology to modify media or completely fabricate media have become increasingly sophisticated and difficult for an individual to discern, which poses new challenges. For example, it is increasingly difficult for a person (and often computers) examining media content to discern whether the video he/she is watching of a famous individual saying something inflammatory is genuine or the result of a nefarious user creating a "deep fake" (i.e., a synthetic, but often convincing) video to hurt that famous individual's brand or sway the public's opinion of that individual. As another example, electronic/digital media may be exchanged to establish an individual's identity, and fakes/forgeries/deep fakes, etc. are becoming increasingly sophisticated and difficult to discern by people (and often computers) examining the content of the media. The features and functionalities described herein may at least partially address and/or overcome one or more such challenges.

SUMMARY

This specification relates to methods and systems for authenticating digital media based on metadata. According to one aspect of the subject matter described in this disclosure, the method includes extracting, using one or more processors, metadata from a first media file, wherein the metadata is distinct from media content; encoding, using the one or more processors, a first portion of the metadata extracted from the first media file into a first metadata-encoded media signature; and determining, using the one or more processors, whether the first metadata-encoded media signature is indicative a defect.

Other implementations of one or more of these aspects include corresponding systems, apparatus, and computer programs, configured to perform the actions of the methods, encoded on computer storage devices.

These and other implementations may each optionally include one or more of the following features. For instance, in some implementations, determining whether the first metadata-encoded media signature is indicative of the defect comprises an intra-media analysis may include one or more of: determining whether the first metadata-encoded media signature indicates an inconsistency between two or more metadata values, wherein each of the two or more metadata values are associated with a different set of metadata associated with the first media file but include an informational overlap; and determining whether the metadata-encoded signature indicates an absence of expected metadata. For instance, in some implementations, the different metadata sets include at least one from a group of: exchangeable image file format (EXIF) metadata, extensible metadata platform (XMP) metadata, International Press Telecommunications Council (IPTC) metadata, International Color Consortium (ICC) Profile metadata, comment metadata, and thumbnail metadata. For instance, in some implementations, determining whether the first metadata-encoded media signature is indicative of the defect comprises an intra-transaction analysis, wherein the intra-transaction analysis includes: obtaining a second metadata-encoded media signature associated with a second media file, wherein the first media file and second media file are associated with a common transaction; and determining whether the first metadata-encoded media signature is consistent with the second metadata-encoded media signature. For instance, in some implementations, determining whether the first metadata-encoded media signature is indicative of the defect comprises an inter-transaction analysis, wherein the inter-transaction analysis includes: obtaining a second metadata-encoded media signature associated with a second media file, wherein the second media file is associated with a prior transaction; and determining whether the first metadata-encoded media signature is consistent with the second metadata-encoded media signature. For instance, in some implementations, determining whether the first metadata-encoded media signature is indicative of the defect may include one or more of: cross-referencing the first metadata-encoded media signature to determine whether the first metadata-encoded media signature is consistent with a representative signature generated via aggregation; cross-referencing the first metadata-encoded media signature against one or more values within, or derived from, the media content; and cross-referencing the first metadata-encoded media signature against source information. For instance, in some implementations, the first metadata-encoded media signature includes one or more of a vector representation and a graphical representation, the first metadata-encoded media signature encoding one or more metadata fields that are present and absent from the metadata. For instance in some implementations, the first metadata-encoded media signature includes encoded values associated with present metadata field. For instance, in some implementations, the encoding includes one or more of a weighted and proximity encoding. For instance, in some implementations, the media content is image-based and includes pixel data associated with one of at least one video frame and a still image.

BRIEF DESCRIPTION OF THE DRAWINGS

The disclosure is illustrated by way of example, and not by way of limitation in the figures of the accompanying drawings in which like reference numerals are used to refer to similar elements.

FIG. 6 is a flowchart of an example method for analyzing a metadata-encoded media signature in accordance with some implementations.

FIG. 8A illustrates a top portion of the table of example metadata fields and associated values for multiple images taken on different devices in accordance with some implementations.

FIG. 8B illustrates a middle portion of the table of example metadata fields and associated values for multiple images taken on different devices in accordance with some implementations.

FIG. 8C illustrates a bottom portion of the table of example metadata fields and associated values for multiple images taken on different devices in accordance with some implementations.

DETAILED DESCRIPTION

Figure 1:
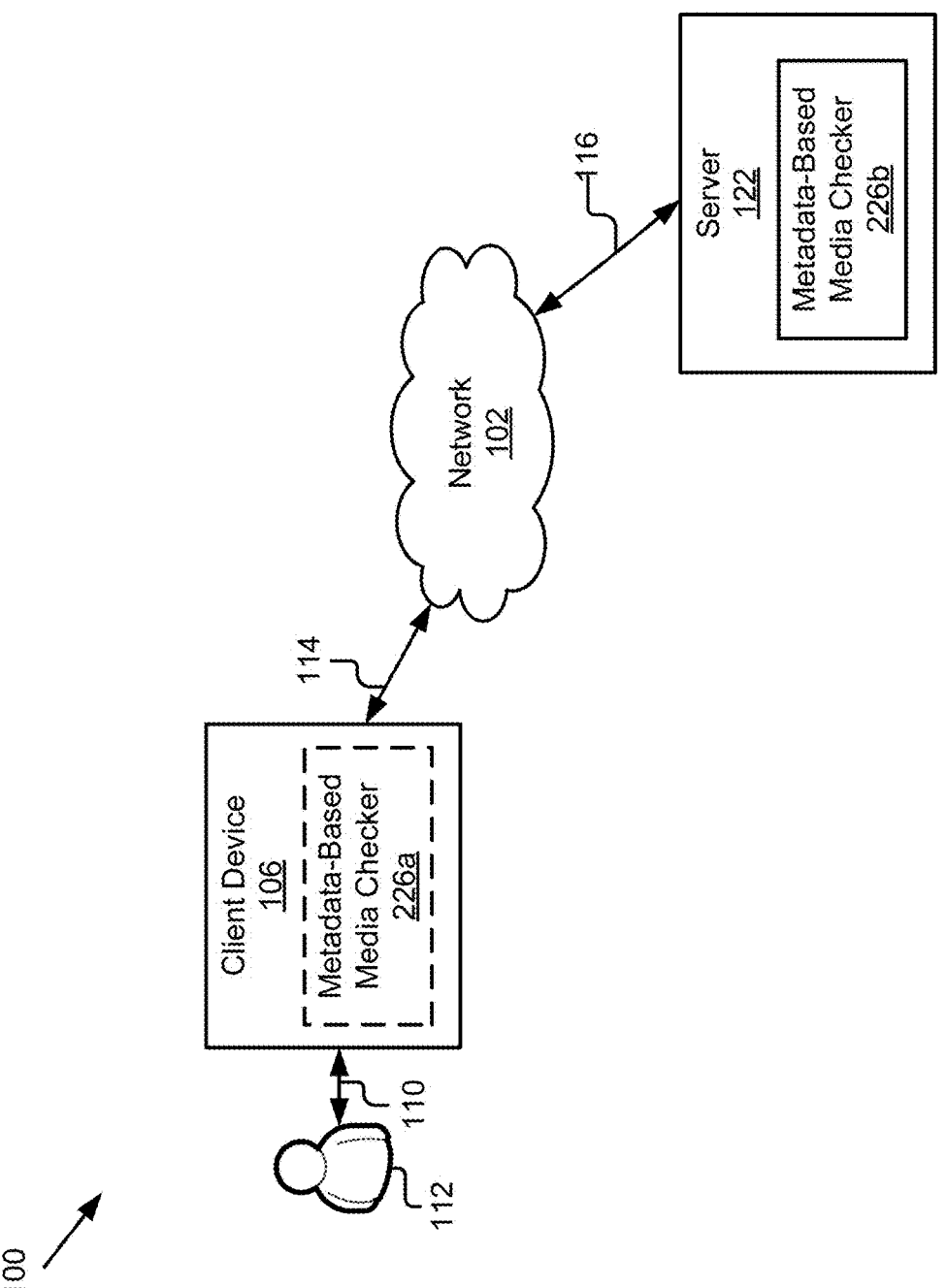
FIG. 1 is a block diagram of one example implementation of a system for metadata-based media authentication in accordance with some implementations.

The present disclosure is described in the context of an example metadata-based media checker and use cases; however, those skilled in the art should recognize that the metadata-based media checker may be applied to other environments, contexts, and use cases without departing from the disclosure herein.

For example, for clarity and convenience, the description below may make repeated reference to an example use case(s) in which the media is a set of one or more images (still or video), where the set of images is provided during a transaction. For example, the example use case(s) may relate to a user identification verification process in which the user provides a selfie image/video of himself/herself and at least one image/video of an identification document so that the user's identity may be verified, thereby allowing the user to open an account, withdrawal, funds, physically gain access to a space, etc.

However, it should be recognized that the examples are provided for simplicity and demonstration and the description herein is not limited to the example use cases, media, etc. For example, other use cases exist and are within the scope of the disclosure including, but not limited to, curtailing uploads of fraudulent images or videos of public figures generated by photo editing or generative AI onto platforms, such as social media and video platforms, preventing injection attacks, etc. As another example, while the examples herein may repeatedly refer to image-based metadata, it should be recognized that other media (e.g., audio) may be associated with metadata and the features and functionalities herein may use and/or be applied to such metadata.

Media authentication is becoming increasingly difficult for multiple reasons. Those reasons include advances in editing software, which may alter media, and new artificial intelligence (AI) based tools. For example, in the context of image-based media, advance in photo editors (e.g., Adobe Photoshop) enable nefarious users to make modification that may be imperceptible to human eyes and even difficult to detect using existing authentication methods that examine the pixel data of the image (including computer vision based methods). As another example, in the context of image-based media, artificial intelligence (AI) based tools exist and continue to be developed that may alter images or generate completely new images. For example, AI-based tools exist which may do a "face swap" in which the tool maps a fraud victim's face, in real-time, onto a fraudster's face for a video submission that may be used to confirm the liveness and/or identity of the user.

As the tools available to nefarious users advance and improve, detecting manipulation and fraud by examining the media content becomes increasingly difficult. However, nefarious users and the tools they use generally focus on the media content and the humanly perceivable aspects of the media content. For example, they seek to reduce visible artifacts from mapping the fraud victim's face onto the nefarious user's face in a face swap, or the visible artifacts created when changing information in the fields of an identification document in a digital image, they attempt to sync the lips with the words recorded in the audio, etc. That content-based focus may make the fraudulent media more convincing to humans and to computer-implemented processes particularly those based on human perception (e.g., computer vision) and that examine the media payload content (e.g., the pixel data of the image). However, such tools often ignore metadata and/or fail to generate or manipulate associated metadata in furtherance of the nefarious goal, thus the associated metadata may include one or more metadata defects detectable by the systems and methods described herein. A first potential benefit of the metadata-based media checker described herein is that it uses metadata, which is frequently overlooked by the nefarious users and/or the tool(s) they use. A second potential benefit of the metadata-based media checker described herein is that, even when the metadata is taken into consideration and manipulated (e.g., by the nefarious user and/or a tool), the metadata-based media checker may still detect metadata defects in such attempts. A third potential benefit of the metadata-based media checker described herein is that it may supplement a content-based approach (e.g., computer vision-based authentication of the image using the pixel data), so a content and metadata-based approach may be applied, and in some implementations cross-referenced, to reduce successful fraud attempts. A fourth potential benefit of the metadata-based media checker described herein is that it may be more resource efficient than content-based approaches, thereby saving resources such as processor cycles, memory, read/writes, electricity, etc., over content-based approaches or adding comparatively less resource overhead when used in conjunction with content-based approaches.

FIG. 1 is a block diagram of an example system 100 for metadata-based media authentication in accordance with some implementations. As depicted, the system 100 includes a server 122 and a client device 106 coupled for electronic communication via a network 102.

The client device 106 is a computing device that includes a processor, a memory, and network communication capabilities (e.g., a communication unit). The client device 106 is coupled for electronic communication to the network 102 as illustrated by signal line 114. In some implementations, the client device 106 may send and receive data to and from other entities of the system 100 (e.g., a server 122). Examples of client devices 106 may include, but are not limited to, mobile phones (e.g., feature phones, smart phones, etc.), tablets, laptops, desktops, netbooks, portable media players, personal digital assistants, etc.

Although only a single client device 106 is shown in FIG. 1, it should be understood that there may be any number of client devices 106. It should also be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of client devices 106, networks 102, or servers 122.

The network 102 may be a conventional type, wired and/or wireless, and may have numerous different configurations including a star configuration, token ring configuration, or other configurations. For example, the network 102 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), cellular (e.g., 4G or 5G), and/or other interconnected data paths across which multiple devices may communicate.

The server 122 is a computing device that includes a hardware and/or virtual server that includes a processor, a memory, and network communication capabilities (e.g., a communication unit. The server 122 may be communicatively coupled to the network 102, as indicated by signal line 116. In some implementations, the server 122 may send and receive data to and from other entities of the system 100 (e.g., one or more client devices 106).

Other variations and/or combinations are also possible and contemplated. It should be understood that the system 100 illustrated in FIG. 1 is representative of an example system and that a variety of different system environments and configurations are contemplated and are within the scope of the present disclosure. For example, various components, acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc.

For example, as depicted, the client device 106 may include an instance (or portion) of the metadata-based media checker at 226a and the server 122 may include an instance (or portion) of the metadata-based media checker at 226b. However, depending on the implementation, the components and functionality of the metadata-based media checker 226 may be entirely client-side (i.e., at 226a), entirely server side (i.e., at 226b), or divide among the client device 106 and server 122 (i.e., divided across 226a and 226b). The metadata-based media checkers 226a and 226b are collectively or individually referred to herein as the metadata-based media checker 226.

As another example, other devices (not shown) and services (not shown) may be present. For example, one or more other servers (not shown) associated with one or more third parties, such as financial institution(s) or other entity/entities (e.g., a media or social media platform(s)), may be coupled to the network 102, and the metadata-based media checker 226 may check media metadata upon request of that entity (e.g., to confirm image authenticity before using the image to verify the user/customer identity, complete a transaction, post an uploaded video, etc.).

Figure 2:
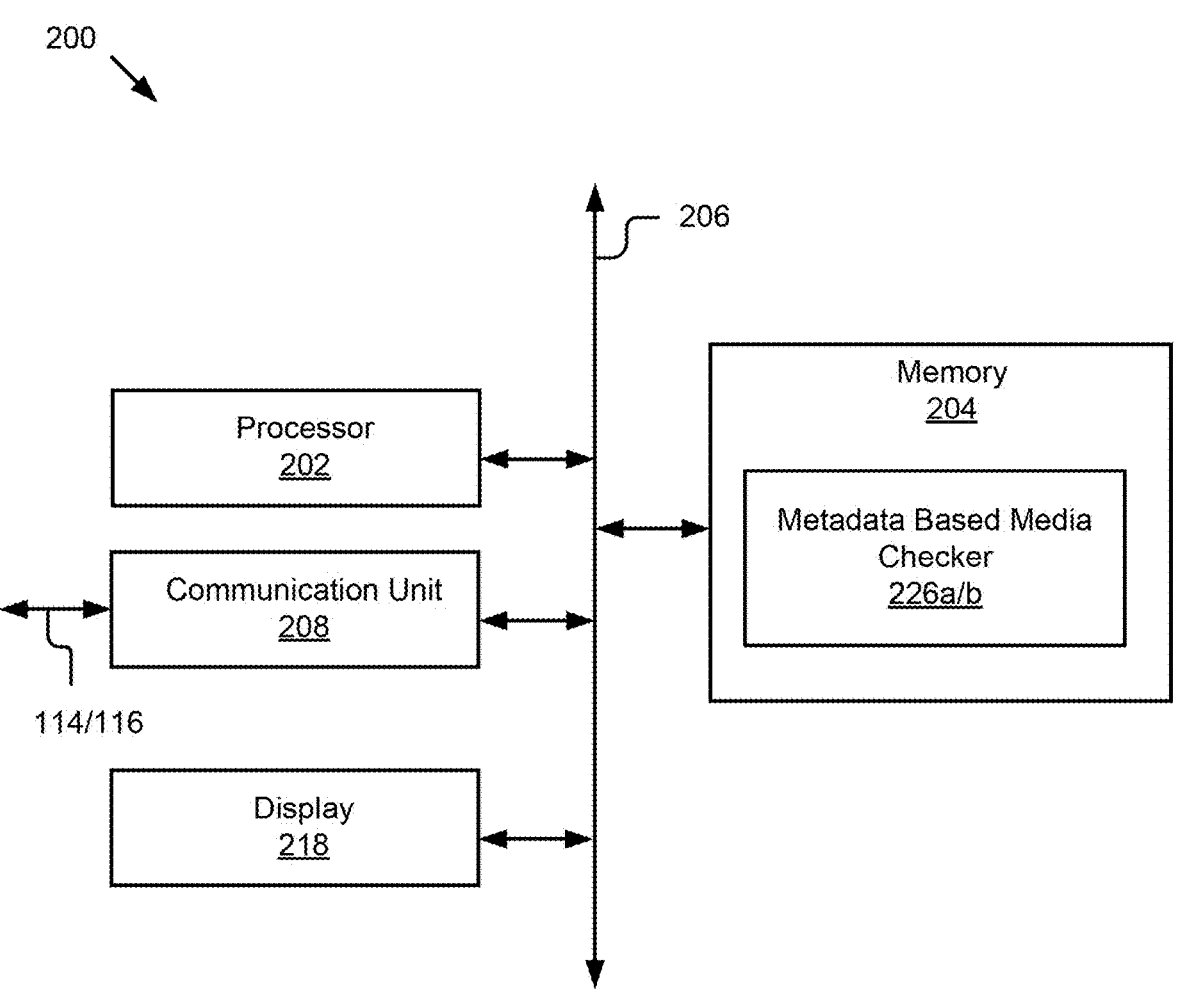
FIG. 2 is a block diagram of an example computing device in accordance with some implementations.

FIG. 2 is a block diagram of an example computing device 200 including an instance of the metadata-based media checker 226. In the illustrated example, the example computing device 200 includes a processor 202, a memory 204, a communication unit 208, and a display 218. In one implementation, the computing device 200 is a client device 106, the memory 204 stores the metadata-based media checker 226a, and the communication unit 208 is communinicatively coupled to the network via signal line 114. In another implementation, the computing device 200 is a server 122, the memory 204 stores the metadata-based media checker 226b, and the communication unit 208 is communicatively coupled to the network via signal line 116.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single processing unit or a plurality of processing units and/or cores. In some implementations, the processor 202 may be capable of generating and providing electronic display signals to a display device, supporting the display of images, capturing and transmitting images, and performing complex tasks and determinations. In some implementations, the processor 202 may be coupled to the memory 204 via the bus 206 to access data and instructions therefrom and store data therein. The bus 206 may couple the processor 202 to the other components of the computing device 200 including, for example, the memory 204, the communication unit 208.

The memory 204 may store and provide access to data for the other components of the computing device. The memory 204 may be included in a single computing device or distributed among a plurality of computing devices. In some implementations, the memory 204 may store instructions and/or data that may be executed by the processor 202. The instructions and/or data may include code for performing the techniques described herein. For example, in one implementation, the memory 204 may store an instance of the metadata-based checker 226a/b. The memory 204 is also capable of storing other instructions and data, including, for example, an operating system, hardware drivers, other software applications, databases, etc. The memory 204 may be coupled to the bus 206 for communication with the processor 202 and the other components of the computing device 200.

The memory 204 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-Ray™, etc.) mediums, which can be any tangible apparatus or device that can contain, store, communicate, or transport instructions, data, computer programs, software, code, routines, etc., for processing by or in connection with the processor 202. In some implementations, the memory 204 may include one or more of volatile memory and non-volatile memory. It should be understood that the memory 204 may be a single device or may include multiple types of devices and configurations.

The communication unit 208 is hardware for receiving and transmitting data by linking the processor 202 to the network 102 and other processing systems. The communication unit 208 receives data and transmits the data via the network 102. The communication unit 208 is coupled to the bus 206. In one implementation, the communication unit 208 may include a port for direct physical connection to the network 102 or to another communication channel. For example, the computing device 200 may be the server 122, and the communication unit 208 may include an RJ45 port or similar port for wired communication with the network 102. In another implementation, the communication unit 208 may include a wireless transceiver (not shown) for exchanging data with the network 102 or any other communication channel using one or more wireless communication methods, such as IEEE 802.11, IEEE 802.16, Bluetooth® or another suitable wireless communication method.

In yet another implementation, the communication unit 208 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another implementation, the communication unit 208 may include a wired port and a wireless transceiver. The communication unit 208 also provides other connections to the network 102 for distribution of files and/or media objects using standard network protocols such as TCP/IP, HTTP, HTTPS, and SMTP as will be understood to those skilled in the art.

The display 218 may be a liquid crystal display (LCD), light emitting diode (LED), touchscreen, or any other similarly equipped display device, screen, or monitor. The display 218 represents any device equipped to display electronic images and data as described herein.

It should be apparent to one skilled in the art that other processors, operating systems, inputs (e.g., keyboard, mouse, one or more sensors, etc.), outputs (e.g., a speaker, display, haptic motor, etc.), and physical configurations are possible and within the scope of the disclosure. Examples of sensors (not shown) include, but are not limited to, a microphone, a camera, a thermal camera, a pointer sensor (e.g., a capacitive touchscreen or mouse), a gyroscope, an accelerometer, a galvanic sensor, thermocouple, heart rate monitor, breathing monitor, electroencephalogram (EEG), iris scanner, fingerprint reader, raster scanner, palm print reader, an inertial sensor, etc.

Figure 3:
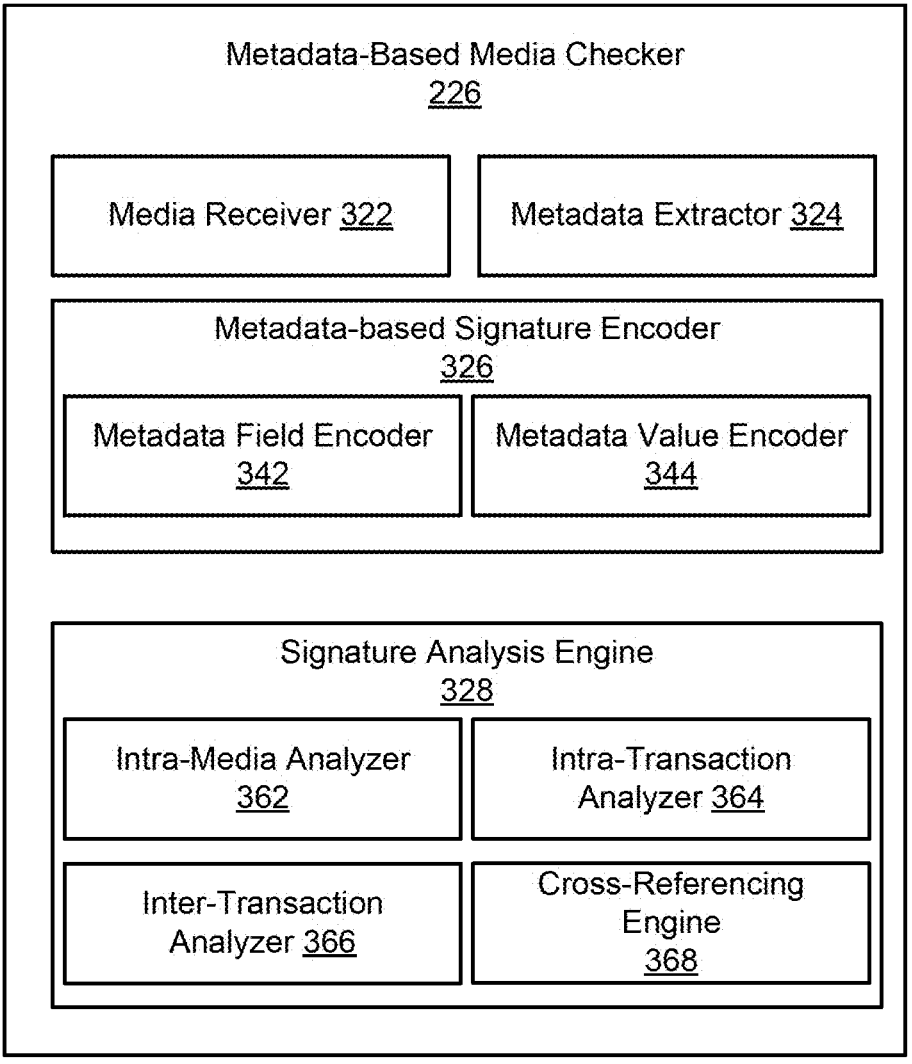
FIG. 3 is a block diagram of an example metadata-based media authentication in accordance with some implementations.

Referring now to FIG. 3, a block diagram of an example of metadata-based media checker 226 is illustrated in accordance with one implementation. As illustrated in FIG. 3, the metadata-based media checker 226 may include a media receiver 322, a metadata extractor 324, a metadata-based signature encoder 326, and a signature analysis engine 328. In some implementations, the components 322/324/326/328 and subcomponents 342/344/362/364/366/368 are communicatively coupled to perform the features and functions described below. For example, the components and subcomponents may be communicatively coupled to send and receive information to one another to perform the features and functions described below, or may be communicatively coupled (e.g., to the memory 204) to store the information and other components or subcomponents are communicatively coupled to access and retrieve the stored information (e.g., in the memory).

The media receiver 322 receives media. The media that the media receiver 322 receives may vary depending on the implementation and use case. For example, the media may vary in type. Examples of media types include, but are not limited to, images (still and/or video) and audio. The media may vary in format. For example, still image media may be associated with a joint photographic expert group image (JPEG) format, a portable network graphics (PNG) format, tag image file format (TIFF), bitmap (BMP) file format, etc. Media associate with video may be associated with a format such as MPEG-4, MOV, AVI, WMV, AVCHD, WebM, FLV, etc. Media associated with audio media may be associated with a format such as MP #, AAC, WAV, FLAC, DSD, etc.

The media received by the media receiver 322 may include digital media in the form of a media file. A media file may include multiple constituent components including media data and metadata. For example, media data may include the pixel data for rendering/presenting an image in the context of an image-based media, audio data for rendering/presenting sound in the context of auditory media, or both.

In some implementations and use cases, the context of the media received by the media receiver 322 may vary. Continuing the example in which one or more images (i.e. media) are received by the media receiver 322, the media received may be associated with one or more of a live capture channel, an upload channel, and an API channel. An example of a live capture channel and context includes, but is not limited to, where the user 112 takes a picture of his/her government issued ID and/or himself/herself using a camera the client device 106 and the one or more images are obtained by the media receiver 322. An example of the upload channel and context includes, but is not limited to, a user uploading an image of his/her government issued ID from disk (e.g., via a web browser) and received by the media receiver 322. An example of an API channel and context includes, but is not limited to, a user providing the one or more images to a third-party entity (e.g., an app or website of a financial institution, government, etc.), who then sends the one or more images to the metadata-based media checker 226 for verification, and the media receiver 322 receives those images. As described further herein, the context may have implications on the metadata, and, in some implementations, the features and functionalities performed by the metadata-based media checker 226 and/or portions thereof are context-aware. Therefore, it should be understood that, in some implementations, the metadata-based media checker 226 is adaptable and at least partially overcomes technical problems associated with and posed by multi-channel environments, e.g., where media may be received as live capture via an application on a user's mobile device, from a web browser captured by disparate devices (e.g., a web cam and a document scanner), or via an API channel from a third-party.

The metadata extractor 324 extracts the metadata from the media. In the example context of media that is an image, the metadata may be 5 kb-10 kb of a 10 Mb image file, the bulk of the remaining bytes being the media content (i.e., pixel data). Therefore, it should be recognized that the metadata is orders of magnitude smaller than the media content, and processing the metadata may, accordingly, be less resource intensive than content-based approaches (e.g., computer-vision-based approaches in the context of images) or supplement those approaches while adding comparatively little overhead.

As described above, the context of the media capture and/or receipt may vary depending on the implementation and use case. Such variation may cause differences in the metadata associated with the media (e.g., different amounts of metadata, different types of metadata, different metadata fields, different metadata values, or a combination or permutation thereof). For example, a live capture context may result in a more complete set of metadata than an API context, as an image received in the live capture context may have details about the capturing device (hardware and/or software, versions, settings, etc.), time and geolocation of capture, etc., while an image received via an API channel may have had some of the metadata altered (e.g., as a result of the bank rectifying and cropping the image) or discarding metadata (e.g., not preserving or providing the original metadata associated with the image the entity initially received).

The metadata associated with media may vary based on the media type. For example, audio, video, and images may be associated with different sets of metadata. For continuity, clarity, and convenience, the description herein continues to focus on the example use case where the media is one or more images. However, it should be recognized that the use of, and application to, other media types and metadata is within the scope of this description.

The metadata associated with media may vary based on the file format of the media. For example, a JPEG image may be associated with a different set of metadata (e.g., EXIF metadata) that may or may not be associated with another image format. For continuity, clarity, and convenience, the example images (selfie and/or document images) in the example scenario described herein are JPEG images. However, it should be understood that other formats exist and may be used without departing from the description herein.

In some implementations, the metadata associated with a single piece of media (e.g., a single JPEG image file) may include one or more sets of metadata. For example, in some implementations and use cases, the different sets of metadata associated with a JPEG image may include, but are not limited to, one or more of an exchangeable image file format (EXIF) metadata, extensible metadata platform (XMP) metadata, International Press Telecommunications Council (IPTC) metadata, International Color Consortium (ICC) Profile metadata, comment metadata, and thumbnail metadata. However, it should be noted that the foregoing are merely non-limiting examples and other metadata sets exist and may be extracted and used without departing from the disclosure herein.

The metadata-based signature encoder 326 generates a metadata-encoded media signature by encoding at least a portion of the metadata. Depending on the implementation, the portion of the metadata may include one or more of: metadata field data, metadata value data, and derived data (i.e., data derived from other metadata fields or metadata values). In the illustrated implementation of FIG. 3, the metadata-based signature encoder 326 includes a metadata field encoder 342 and a metadata value encoder 344. In some implementations, the metadata-based signature encoder 326 may include a derived value encoder (not shown) for deriving new values and fields from existing metadata (e.g., a resolution aspect ratio from X and Y resolution metadata values).

In some implementations, the metadata field encoder 342 encodes field data in the metadata extracted by the metadata extractor. Depending on the implementations, the extracted field data encoded by the metadata field encoder 342 may describe one or more of: (1) whether a field is present in the metadata, (2) whether the field is absent in the metadata, whether the field is present and associated with a "null" value, and (3) whether the field is present in the data and associated with a non-null value. For example, in some implementations, the metadata field encoder 342 may generate a metadata-encoded media signature at least in part by generating a vector in which a metadata field that is not populated, or not present, is assigned a first value (e.g. "0") at a vector index associated with that metadata field, and a field that is populated is assigned a second value (e.g., a "1") at the vector index associated with that field. As another example, in some implementations, the metadata field encoder 342 may generate a metadata-encoded media signature at least in part by generating a vector in which a metadata field that is not populated, or not present, is assigned a first value (e.g., "0") and a field that is populated with a "null" is assigned a second value (e.g. a "1"), and a field that is populated with a non-null value is assigned a third value (e.g., a "2").

In some implementations, the metadata-based signature encoder 326 encodes field value data from the metadata extracted by the metadata extractor 324. Value data may refer to the value stored for an associated metadata field. In some implementations, value data is a non-null value, but in some implementations "null" may be considered a value. For example, in some implementations, the metadata-based signature encoder 326 may create a metadata-encoded media signature at least in part by generating a vector that includes the metadata value or a value derived therefrom. For example, a "Exif.Photo.PixelXDimension" EXIF metadata field may have an associated value of "4032." Depending on the implementation, the value "4032" may be reproduced in the signature (i.e., a vector in this example) generated, assigned to a pixel width class/category "3" so a "3" appears in the corresponding vector at an index position associated with pixel width, or is otherwise encoded into the metadata-encoded media signature.

Depending on the implementation and use case, the number signatures and level of detail encoded for single media file may vary. For example, in some implementations, a first signature encoding only field data (e.g., of the one or more of the metadata sets associated with the media or a subset thereof) may be initially generated and used effectively as a first filter, and based on a result of the analysis of that first signature by the signature analysis engine 328 (or its subcomponents), which are described further below, one or more additional or different (e.g., more detailed signatures—e.g., encoding metadata field values) may be generated by the metadata-based signature encoder 326 (or components 342 and/or 344) for subsequent analysis.

The encoding may vary based on the implementation and use case. For example, the above examples describe an encoding based on vectorization. However, other encodings exist and are within the scope of this description. For example, the encoding(s) may include, but are not limited to encoding as a graph representation. For example, in some implementations, a root node may be associated with a media, each metadata element may be represented as one intermediary node type (e.g., a metadata set, such as EXIF, and/or each metadata field, may be represented as different node types); different values of a particular metadata element (e.g., value associated with a particular field represented by an intermediary node) may be associated with different nodes (e.g., leaf node(s)); and an edge between nodes may indicate presence in the metadata. For example, an edges from a first image root node to an EXIF intermediary node, to an Image X Resolution intermediary node, to a [72, 1] leaf node may encode that the first image media is associated with EXIF metadata that includes an "Exif.Image.XResolution" field with a value of "[72, 1]" and an absence of an edge to an XMP node may indicate an absence of XMP metadata. In some implementations, a path within a graph representation may be encoded (e.g., as a vector for incorporation into a metadata-encoded media signature). In some implementations, a root node may be associated with a transaction and the graph associated with the metadata of one or more media associated therewith may be sub-graphs thereof.

In some implementations, the encoding performed by the metadata-based signature encoder 326 (or components thereof, e.g., the metadata value encoder 344) may include proximity-based encoding. For clarity and convenience please consider the live capture image context of the example used herein. Some metadata fields are expected to vary when a user takes a picture of the front of his/her ID, the back of his/her ID, and a selfie. For example, a time of capture will vary at least some, the location could vary to some degree because he/she is in transit or because of sensor resolution and rounding, etc. Proximity encoding may be applied by the metadata-based signature encoder 326 to reduce an impact of metadata variations, particularly when some degree of variation is expected in legitimate circumstances/absent fraud and differences may not necessarily be indicative of, or determined to be, an inconsistency or defect upon analysis.

In some implementations, the encoding may include a weighted encoding. In some implementations, a weight assigned by the encoding may be associated with an importance of the metadata field or metadata value being encoded on whether the media is associated with fraud. For example, in a live capture context, it is unlikely that the field or value data associated with the device make, model, manufacturer, software version number(s), etc. should vary between the images. Therefore, those encodings may receive a relatively high weight in an encoding used by the signature analysis engine 328 for a live capture context. However, in the context of an upload variations in metadata generated by a document scanner (e.g. manufactured by HP or Brother) and a web camera (e.g., manufactured by Logitech) may be expected and the metadata given a lower weight when encoding.

While proximity and weight are described above with reference to encoding, it should be recognized that proximity and/or weighting may be applied, alternatively or additionally, when analyzing the metadata-encoded signature(s).

It should be recognized that the metadata sets, fields, and values provided herein are merely examples provided for clarity and convenience and the others exist and are within the scope of this description. For example, at the time of filing, there are approximately 8,000 different metadata fields for still images. It should also be recognized that the representation of those fields may vary without departing from the scope of the description. For example, an encoding of the Exif.Photo.PixelXDimension field (or associated value) may be consistently encoded at the $2^{nd}$ index in a vector, at the $27^{th}$ index, or at another index in a metadata-based signature vector without departing from the disclosure.

In some implementations, the metadata-based signature encoder 326 may generate multiple metadata-encoded media signatures for a given media. For example, in some implementations, the metadata-based signature encoder 326 may generate a first metadata-encoded media signature encoding only field data for an initial analysis by the signature analysis engine 328 and may generate a first metadata-encoded media signature encoding value data for further analysis by the signature analysis engine 328 upon request of the signature analysis engine. As another example, in some implementations, the metadata-based signature encoder 326 may generate a metadata-encoded media signature encoding field data and perform a reduction. For example, with approximately 8,000 possible metadata fields for an image; in some implementations, the metadata-based signature encoder 326 performs a reduction (e.g., to eliminate sparsely used fields and/or empty fields) to reduce the dimensionality of a metadata-encoded media signature.

The signature analysis engine 328 analyzes one or more metadata-encoded media signatures generated by the metadata-based signature encoder 326. In some implementations, the signature analysis engine 328, through the analyzes, determines whether the media associated with a metadata-encoded signature indicates a defect in the metadata. A defect, sometimes also referred to herein as an "inconsistency," as determined by analyzing one or more metadata-encoded signatures, may be indicative of, or increase the likelihood that, the associated media is fraudulent, inauthentic, untrustworthy, invalid, synthetic, doctored, forged, deceptive, counterfeit, etc. When a defect is absent, sometimes referred to herein as a "defect free," "consistent," etc., as determined by analyzing one or more metadata-encoded signatures, it may be indicative of, or increase the likelihood that, the associated media is genuine, authentic, trustworthy, valid, etc. In some implementations, the signature analysis engine 328 may determine whether the associated media or a transaction associated with that media should be accepted, rejected, or further scrutinized based on an analysis of at least one metadata-encoded signature associated with the media.

In the illustrated implementation of FIG. 3, the signature analysis engine 328 includes an intra-media analyzer 362, an intra-transaction analyzer 364, an inter-transaction analyzer 366, and a cross-referencing engine 368. However, depending on the implementations, one or more of the components 362/364/366/368 may be omitted, other components (not shown) may be present, or the features and functionalities described herein may be divided differently.

In some implementations, the analysis performed by the signature analysis engine 328 or the subcomponent(s) thereof is context sensitive, also potentially referred to herein as context aware. For example, when media is received through an API channel, it may be associated with less metadata than media associated with a live capture channel absent any sort of fraud or malfeasance. In some implementations, the signature analysis engine 328 may receive an indication of context, e.g., from the media receiver 322, so that channel or context-based differences do not reduce the accuracy of the results of the signature analysis engine 328 or the subcomponent(s) thereof. Depending on the implementations, the context may be provided to the signature analysis engine 328 or its subcomponents by various mechanisms. For example, in some implementations, the context may be provided by the media receiver 322, while, in some implementations, the context may be encoded as part of the signature.

It should also be understood that the context awareness allows for flexibility while maintaining accuracy as one or more of the analyses described herein, with reference to the signature analysis engine 328 or a component thereof, may be tailored to different contexts (e.g., different channels) and/or to different sources within a particular channel. For example, in some implementations, one or more of the analyses described herein may be adjusted, or optimized, to accurately perform analysis for financial institution A, which provides (or preserves) a first set of metadata through the API channel, and to accurately perform analysis for financial institution B, which provides (or preserves) a different, second set of metadata through the API channel.

The intra-media analyzer 362 analyzes one or more metadata-encoded media signatures generated by the metadata-based signature encoder 326 associated with a single media file. For example, consider an image purported to be a selfie of the authorized account holder that is submitted in a live capture context. In some implementations, the intra-media analyzer 362 analyzes the metadata-encoded media signature(s) associated with that image to determine whether a defect is present.

In some implementations, the analysis performed by the intra-media analyzer 362 is based on internal consistency of the metadata associated with the media, which may be determined by analyzing the signature(s) encoding that metadata. A single JPEG may be associated with different sets of metadata and those sets of metadata may have different focuses. For example, the exchangeable image file format (EXIF) metadata may describe technical details associated with the image, such as the equipment used to capture the image, the extensible metadata platform (XMP) metadata may describe modifications made to the image, International Press Telecommunications Council (IPTC) metadata may focus on the content of the image and/or the ownership, rights, or licensing, International Color Consortium (ICC) Profile metadata may describe how to correctly convert the image between different color spaces, etc. However, in some use cases, values for different metadata fields (in the same metadata set or across sets of metadata) may be expected to be consistent. For example, the time of capture may be represented in both the IPTC metadata and the EXIF metadata, may both describe the same event (i.e., image capture), and are expected to be consistent in an authentic, genuine, unaltered, non-fraudulent, unforged, real, etc. image. Similarly, a location of capture, when present in both the EXIF and IPTC metadata for the same image, is expected to be consistent, thus these overlapping metadata fields may be analyzed to determine whether inconsistencies, also referred to herein as "defects," are present.

It should be understood that, as used throughout this description "consistent" (or a lack of a defect) may or may not be "identical," depending on one or more of the implementation and the use case. For example, consistent may mean "identical" for a subset of field values expected to be identical (e.g., between different fields or metadata sets associated with a first image) and/or similar may mean "similar" for another subset of field values expected to be similar, e.g., due to some expected variation. For example, variations may be expected for reasons including, but not limited to, a difference in rounding/number of digits, a difference that may be attributable to a resolution of an associated sensor, etc. As another example, in an intra-transaction analysis (discussed below) some degree of variation between the time of capture for each of multiple images associated with a common transaction is expected; however, the period of time in which those images are captured and/or amount of lapsed time between image captures may need to satisfy a threshold to be "consistent," and too much elapsed time between images may be determined to be an "inconsistent" or a "defect."

Figure 7:
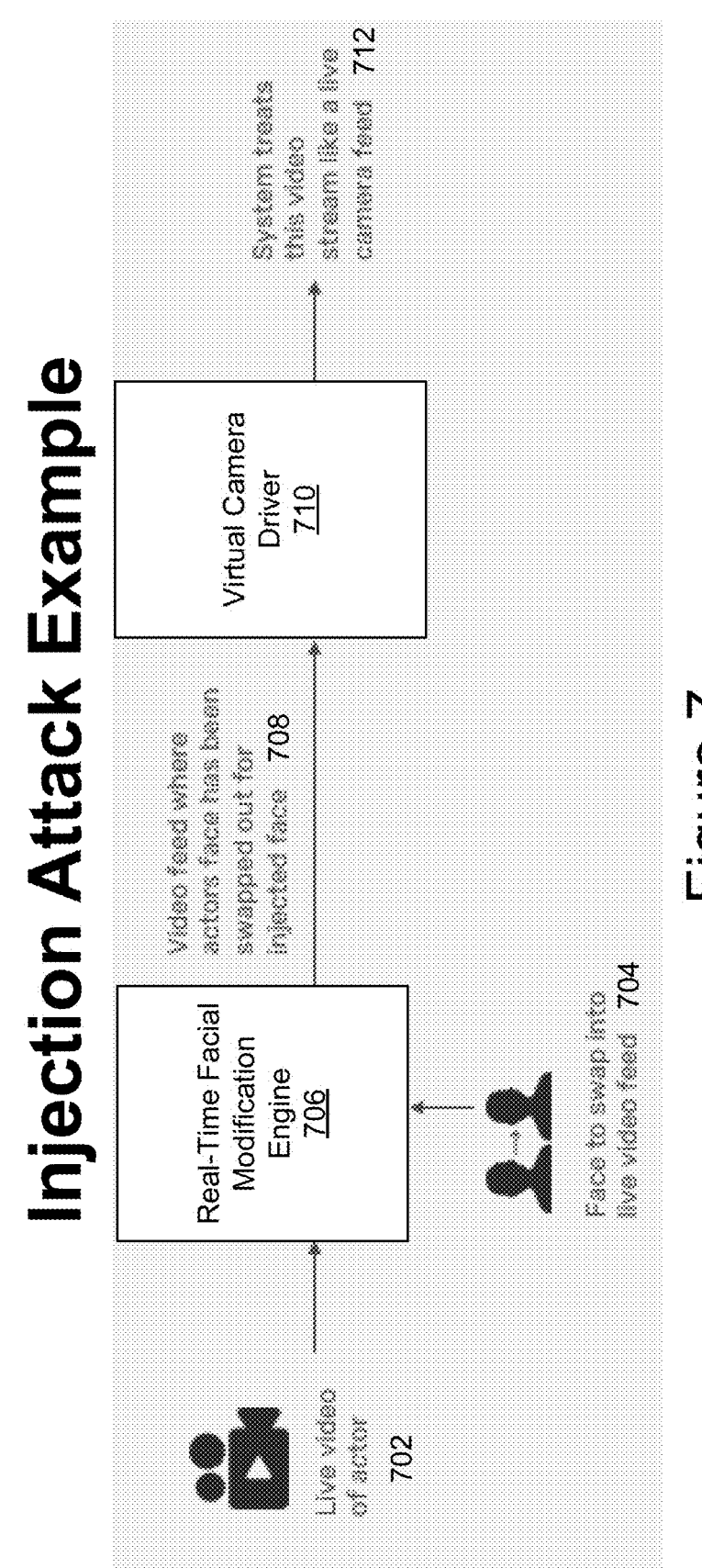
FIG. 7 illustrates a graphic representation of an example injection attack is illustrated in accordance with some implementations.

In some implementations, the analysis performed by the intra-media analyzer 362 is based on metadata presence and/or absence. The presence or absence may be of a field and/or a value associated with a metadata field. For example, "screenshot" may appear as a value in the metadata of an image. When such metadata is present in an image purported to be a live capture (i.e., from the user's on-device camera), the presence of that metadata may be indicative of the inauthenticity of the associated image. As another example, injections attacks are becoming increasingly common and sophisticated. Referring to FIG. 7, a diagram illustrating an example of an injection attack is provided. In the illustrated injection attack, a nefarious user provides a facial image of the face the nefarious user intends to impersonate. The facial image may be of a soon-to-be-victim of identity theft or of an artificial face created using generative AI. Live video of the nefarious user (or an actor) is captured by a device's camera at 702 and fed into a real-time facial modification engine 706. The real-time facial modification engine 706 swaps or morphs the nefarious user/actors face into the victim's face in real time and provides the feed to a virtual camera driver 710, which outputs the image(s), e.g., for receipt by the media receiver 322. Injection attacks, however, generally focus on the media being indistinguishable by human perception. For example, whether human or computer-vision based analysis of the video or image(s) can detect the inauthenticity. However, virtual camera drivers 710, real-time facial modification engines 706, and other tools used by nefarious users generally do not address metadata. Therefore, assuming a still JPEG image is captured and sent by the virtual camera driver 710, the metadata associated with that JPEG is likely going to be different (e.g., very sparse in terms of fields and/or values populated in those fields), particularly compared to an image normally captured by the device at 702 in a live capture scenario, but likely sparse compared to an upload or API channel context as well. Such a relative absence, or sparsity, of (expected) populated metadata fields may be efficiently determined, by the intra-media analysis engine 362, to be a defect and may be used to reject even the most convincing (from a media content perspective) fraud attempts as likely to be one or more of synthetically generated, modified, inauthentic, not genuine, deceptive, false, counterfeit, fraudulent, etc.

In some implementations, the analysis of the intra-media analyzer 362 is context sensitive. For example, XMP metadata may store information about transformations applied to the image (not shown). Depending on the use case and context, those transformations in the metadata may be considered a defect (e.g., as indicative of nefarious or fraudulent activity from using a photo editor to alter information on a document in the image). For example, in a live capture context, the presence of transformation metadata may be determined by the intra-media analyzer 362 as indicative of inauthenticity (e.g., referring to FIG. 8C, in the case of an iPhone or Samsung Galaxy, which do not normally populate XMP metadata fields). By contrast, in some use cases and contexts, transformation metadata may be expected (e.g., in the case of the Google Pixel 6 as illustrated in FIG. 8C, which populates XMP metadata fields) and/or benign. For example, transformation metadata may result from a $3^{rd}$ party cropping and rectifying a document image before submitting the image as media for authentication via an API channel, and that cropping and rectification may (or may not) be represented in the metadata (e.g., XMP metadata) received from the $3^{rd}$ party with that media.

The analysis performed by the intra-media analyzer 362 may vary depending on the implementation. For example, in some implementations, the analysis is based on an intra-media analysis model trained on metadata-encoded media signatures. In another example, in some implementations, the analysis is based on one or more rules such as whether the informationally overlapping metadata field values are consistent, i.e., whether a value in one metadata field associated with a first metadata set (e.g. time of image capture in EXIF metadata) for the image is consistent with another metadata field value associated with a different metadata field in a different metadata set (e.g. time of capture in IPTC metadata) for that same image. In some implementations, the analysis may be a combination of rule-based/heuristics and machine learning models.

The intra-transaction analyzer 364 analyzes a plurality of metadata-encoded media signatures generated by the metadata-based signature encoder 326 from multiple media files associated with a single, common transaction.

Figure 8:
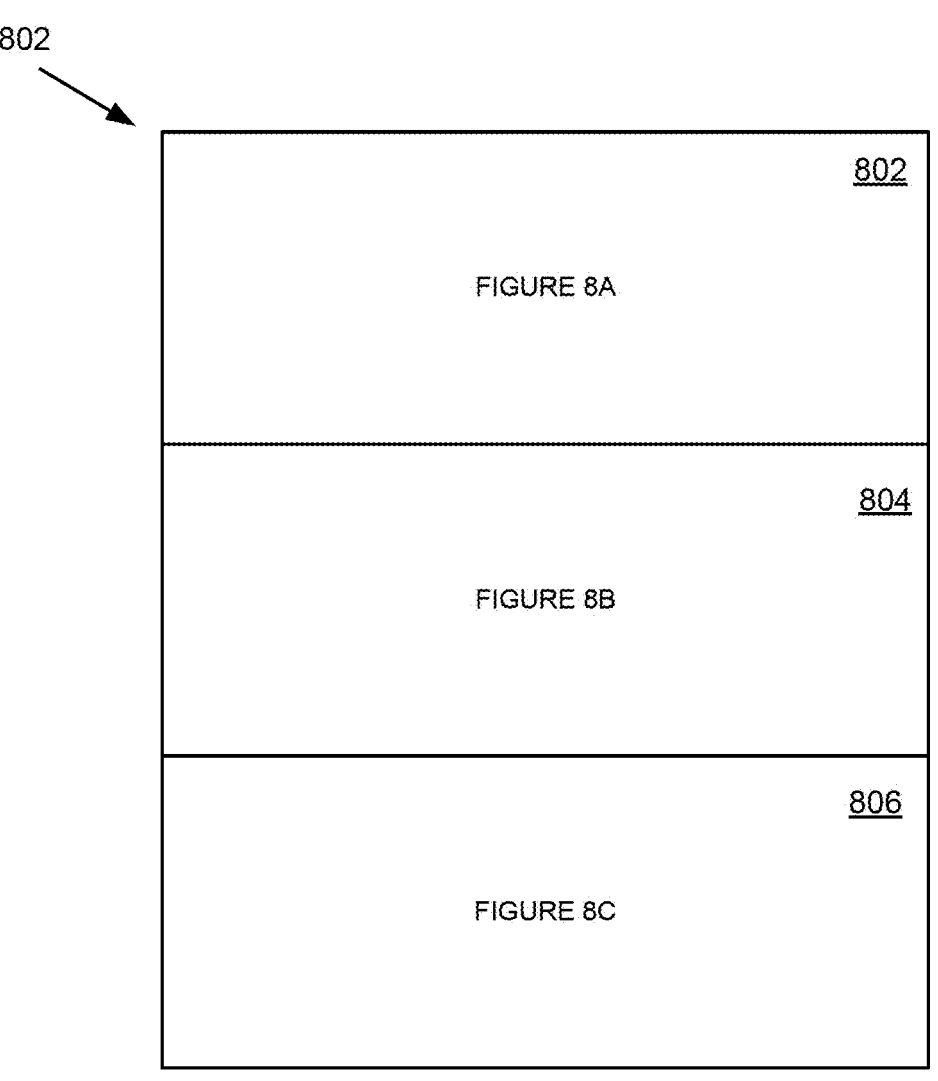
FIG. 8 illustrates a graphic representation of a table of example metadata fields and associated values for multiple images taken on different devices, in accordance with some implementations, where the example table is represented in further detail across FIGS. 8A-8C.

Referring now to FIGS. 8, a representation of a table 800 of metadata (fields and associated values) for six JPEG images taken using the rear-facing camera on three devices is illustrated as being represented across FIGS. 8A-8C. FIG. 8A represents rows associated with a top portion 802 of the table 800, FIG. 8B representing rows associated with a middle portion 804 of the table 800, and FIG. 8C representing rows associated with a bottom portion 806 of the table 800. The EXIF metadata fields and associated values are represented across FIGS. 8A, 8B and a top portion of FIG. 8C. The XMP, ICC profile, comment, and thumbnail metadata are represented in FIG. 8C. The first and left-most column is the metadata field name, the second column is associated with a first JPEG image taken using the rear-facing camera of an iPhone, the third column is associated with a second JPEG image taken using the rear-facing camera of the same iPhone, the fourth column is associated with a first image taken using the rear-facing camera of a Samsung Galaxy phone, the fifth column is associated with a second image taken using the rear-facing camera of the same Samsung Galaxy phone, the sixth column is associated with a first image taken using the rear-facing camera of a Google Pixel 6 phone, and the seventh column is associated with a second image taken using the rear-facing camera of a Google Pixel 6 phone.

FIGS. 8A-8C are merely an example of metadata fields and associated values for six (6) different media from three (3) different devices, and five (5) metadata sets. The number of potential devices, metadata sets, number of metadata sets, number of metadata fields, the particular metadata fields, the possible metadata values associated therewith, and the possible variations thereof are so numerous as to defy listing and/or illustration. Accordingly, the examples of FIGS. 8A-8C are provided as an illustrative example to facilitate understanding. It should further be recognized that metadata fields and/or values may vary from those illustrated. For example, an image captured by a Samsung Galaxy (or other device) may have different metadata fields and/or values than those illustrated in FIGS. 8A-8C for various reasons. For example, the metadata fields and/or values may differ due to a user setting (e.g., GPS values may be omitted or replaced with dummy values with more private settings) or may be altered when received via a particular channel.

For example, assume a transaction includes a user providing an image of the front of his/her government ID, an image of the back of his/her ID, and a selfie image to be compared to the document holder image in the ID, the metadata associated with those three images are likely to have certain fields and values in common, thus the signatures encoding the sets of metadata associated with those three media files are expected to have certain commonalities. Upon examination of FIGS. 8A-8C, it is evident that the field data associated with photos taken by the same device (i.e., which cells are populated) are the same in the two columns associated with the same device. Additionally, many of the values in the cells between columns associated with the same device are the same or within proximity. While the metadata associated with a selfie image taken using the device's front-facing camera may deviate some (e.g., because that camera may use different hardware with a different resolution, aperture, focal length, or other), some values, such as the make, model, software, date, location are likely consistent or within a proximity, and thus the respective metadata-encoded signatures may be analyzed by the intra-transaction analyzer 364 in some implementations.

In some implementations, the intra-transaction analyzer 364, by analyzing the plurality of metadata-encoded media signatures encoded from metadata associated with multiple media files that are associated with a common transaction, the intra-transaction analyzer 364 may efficiently identify patterns or commonalities (also referred to herein as consistencies) present across a set of signatures (at the field and/or value level) across media and/or identify discrepancies (also occasionally referred to herein as "defects" or "inconsistencies").

Inter-transaction analyzer 366 analyzes a plurality of metadata-encoded media signatures generated by the metadata-based signature encoder 326 from multiple media files associated with different transactions.

In some implementations, the different transactions may be associated with a common user and/or common device depending on the implementation and use case. For example, in some implementations, the inter-transaction analyzer 366 analyzes a first metadata-encoded media signatures generated from metadata associated with first media (e.g., associated with a pending transaction) and a second metadata-encoded media signature generated from metadata associated with previously received media (e.g., associated with a previous transaction or attempt).

For example, the inter-transaction analyzer 366 by determining whether the metadata-encoded media signature is sufficiently similar, or proximate, to an earlier metadata-encoded media signature associated with an approved transaction, the inter-transaction analyzer 366 may determine that the media associated with the pending transaction and present metadata-encoded media signature is more likely to be authentic. The inter-transaction analyzer 366, by analyzing metadata-encoded media signature across transactions associated with a common user and/or device, may identify "red flags," which may be indicative of an increased likelihood of inauthenticity or fraud. For example, a software version generally increases over time, so a rollback in software version, particularly by more than one version, could be indicative of inauthenticity or fraudulent intent. As another example, depending on the time differential between transactions, it may be unlikely that the software version updated in the intervening time.

The metadata-encoded media signature(s) generated may vary. In some implementations, a metadata-encoded media signature may encode metadata values and be highly granular/specific. In implementations, where the metadata-encoded media signature is highly specific, that metadata-encoded media signature becomes more like a unique identifier of the image (e.g., specifying the exact time, place, and device on which the image is captured). In some implementations, the metadata-encoded media signatures may be suspiciously similar. For example, while a resubmission of an image may be benign, the inter-transaction analyzer 366 may efficiently identify and thwart serial or bulk attacks where an image with identical (or near identical) metadata encoded into the associated signature is repeatedly submitted by the same user and/or device.

In some implementations, the different transactions analyzed by the inter-transaction analyzer 366 may be associated with different users and/or devices. For example, the inter-transaction analyzer 366 analyzes a first metadata-encoded media signatures generated from metadata associated with first media (e.g., associated with a pending transaction) and one or more other metadata-encoded media signatures generated from metadata associated with previously received media associated with one or more of other users, other devices, and other transactions. For example, as described above, when a metadata-encoded media signature is highly specific (e.g., encodes a set of metadata values unlikely to be reproduced in another metadata set absent replication), suspiciously similar metadata-encoded media signatures across transactions could have a benign explanation (e.g., a resubmission after a single failed attempt). However, suspiciously high degrees of similarity across metadata-encoded media signatures associated with different users and/or devices may be increasingly suspicious. For example, they may be the result of an image of a stolen ID distributed to multiple nefarious users on the dark web who are individually attempting identity theft/fraud.

The cross-referencing engine 368 may perform one or more other analyses. The other analyses may vary in type and scope. Examples of other analyses include, but are not limited to, cross-referencing based on aggregated metadata and/or metadata-encoded media signatures (e.g., to obtain a representative signature or set of signatures), cross-referencing metadata values with media data, cross-referencing metadata values with other information, etc.

In some implementations, the cross-referencing engine 368 may perform an analysis based on an aggregation of metadata-encoded signatures and/or the metadata itself. For example, as one or more of the above analyses are performed, a data set of metadata encoded signatures labeled as defect free and/or defective may be generated. That aggregated data set may be used to determine a set of one or more representative "authentic" (i.e., defect free) signatures. For example, the cross-referencing engine 368 may apply machine learning to the data set (e.g., including columns 6 and 7 of FIGS. 8A-8C) (or generate a set of rules, depending on the implementation) to determine the characteristics of a valid (defect free) metadata encoded signature, such as one or more of what metadata fields are present, what values (e.g., discrete set of valid values, a valid range, format, etc.) are valid, and in what context(s). Thus, the cross-referencing engine 368 may determine a representative signature for a particular context and/or device (e.g., live captured image from a Google Pixel 6) in some implementations.

In some implementations, the cross-referencing engine 368 may cross-reference metadata values (e.g., from the metadata-encoded media signature) with one or more values associated with, or derived from, the media data. For example, in some cases, the metadata may include a bounding box indicating the location of focus (e.g., a face in frame); in some implementations, the cross-referencing engine 368 may cross reference the centroid of such a metadata bounding box with a centroid of a bounding box determined by applying object detection to the image (i.e., the pixel data/media data) to determine whether the centroids are close enough to satisfy a threshold or too different and indicative of inauthenticity. As another example, the media content may include information analogous to, or duplicative of, metadata field values, and the cross-referencing engine 368 may cross-reference those media data values to corresponding metadata values. For example, referring to the example JPEG photographs of FIGS. 8A-8C, the pixel data (i.e., media data) may include a "pixel_width" and a "pixel height," as illustrated in rows 2 and 3 of table portion 802 in FIG. 8, to facilitate consumption of the media content data. In some implementations, such media content data values may be expected to be identical to the corresponding metadata values "Exif.Photo.PixelXDimension" and "Exif.Photo.PixelYDimension" values of rows 14 and 15, respectively, which is true in the illustrated examples of FIG. 8A, but a difference may be an inconsistency and indicative of a defect in some implementations.

In some implementations, the cross-referencing engine 368 may cross-reference metadata values (e.g., from the metadata-encoded media signature) with other information from one or more other sources (e.g., other than the metadata and/or media data). For example, in some implementations, an associated application (e.g., a banking application prompting capture of the various images as part of a transaction; not shown) or software development kit (SDK) (not shown) on the client device 106 may be able to obtain device information, which may be provided to metadata-based media checker 226 (e.g., to the media receiver 322 with the media or to the cross-referencing engine 368). Examples of device information may include, but is not limited to, one or more of a manufacturer, make, model, software (e.g., OS), software version, hardware (e.g., description of camera hardware), etc. In some implementations, the information received from other sources may be cross-referenced to the metadata values (e.g., as encoded in a metadata-encoded signature) to determine whether there is consistency or a defect. For example, if an SDK indicates the device is a Samsung, but the Exif.Image.Make metadata field has a value "Google," that difference may be a defect/inconsistency according to some implementations.

In some implementations, each of the components 362/364/366/368 or a subset thereof, may each return one or more results. For example, in some implementations, the intra-media analyzer 362 may return a score indicative of the likelihood the media is authentic based on the intra-media analysis, the intra-transaction analyzer 364 (when a transaction is associated multiple media files) may return a score indicating the likelihood that the set and/or individual media files within the set are authentic, etc. In some implementations, such individual sub-scores may be aggregated to determine whether the media file is authentic and/or an associated transaction permitted or denied. In some implementations, the sub-scores may be weighted during aggregation.

The various analyses described above may use rules/heuristics, machine learning models, or a combination thereof. In some implementations, machine learning is applied at one or more levels. Machine learning may be applied to train the one or more models using a variety of machine learning techniques, depending on the implementation and use case, including supervised learning, unsupervised learning, semi-supervised learning, etc. The varieties of supervised, semi-supervised, and unsupervised machine learning algorithms that may be used to train the one or more models are so numerous as to defy a complete list. Example algorithms include, but are not limited to, a decision tree; a gradient boosted tree; boosted stumps; a random forest; a support vector machine; a neural network; a recurrent neural network; a recurrent neural network; deep learning; long short-term memory; transformer; logistic regression (with regularization), linear regression (with regularization); stacking; a Markov model; Markov chain; support vector machines; and others.

In some implementations, the signature analysis engine 328 may be trained on a training set of metadata encoded signatures to perform feature reduction and/or selection. For example, in the context of images and FIGS. 8A-8C, approximately one hundred metadata fields are listed in the first column of table 800 across the three figures. While the metadata fields and their values are orders of magnitude smaller than the media data, and the encoding into the signature may further reduce resource utilization and make analysis more efficient, feature reduction and selection may be applied to determine a reduced set of fields and/or values to encode in the signature without negatively impacting (or even improving in some implementations) accuracy of the analysis.

In some implementations, machine learning is applied and one or more models trained to define the relevant "proximity" or an associated threshold for the proximity encoding. For example, machine learning (e.g., based on a classifier of signatures or raw metadata for authentic and inauthentic media) may be applied to learn one or more proximities, e.g., how much time may lapse between images in a transaction or the location may differ before the difference is suspicious and the values are no longer in sufficient proximity, which may applied in a proximity encoding (or an intra-transaction analysis).

In some implementations, machine learning may be applied to determine a set of weights. The weights may be associated with weightings applied while encoding, by one or more machine learning models trained and applied by the analysis engine(s) 328/362/364/366/368, or to their results when aggregating the results for an ultimate decision/result/ determination.

Example Methods

Figure 4:
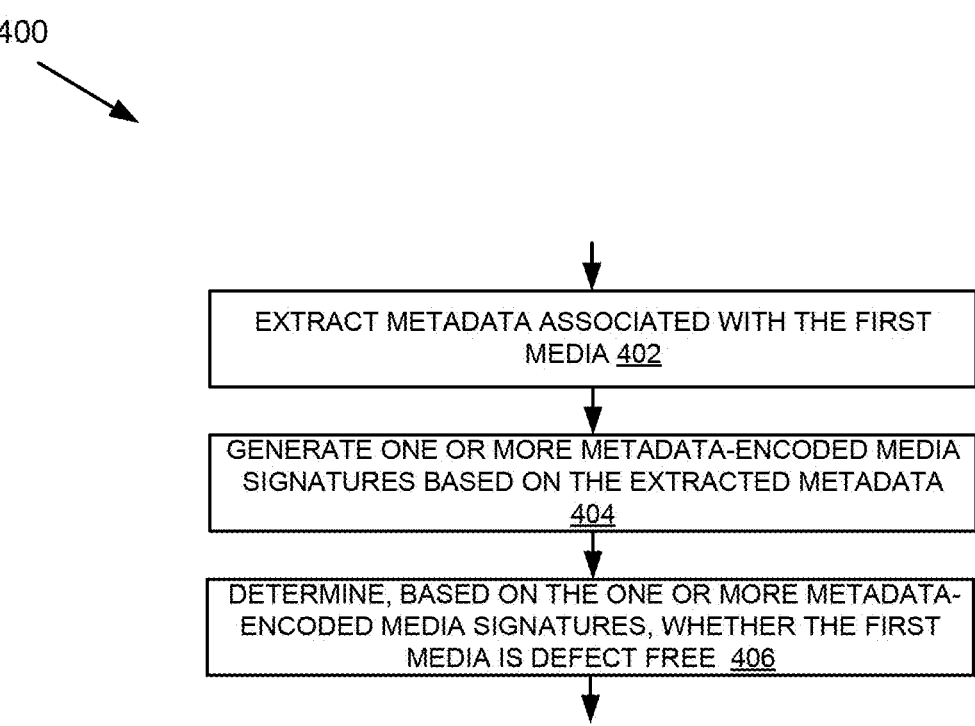
FIG. 4 is a flowchart of an example method for metadata-based media authentication in accordance with some implementations.
Figure 5:
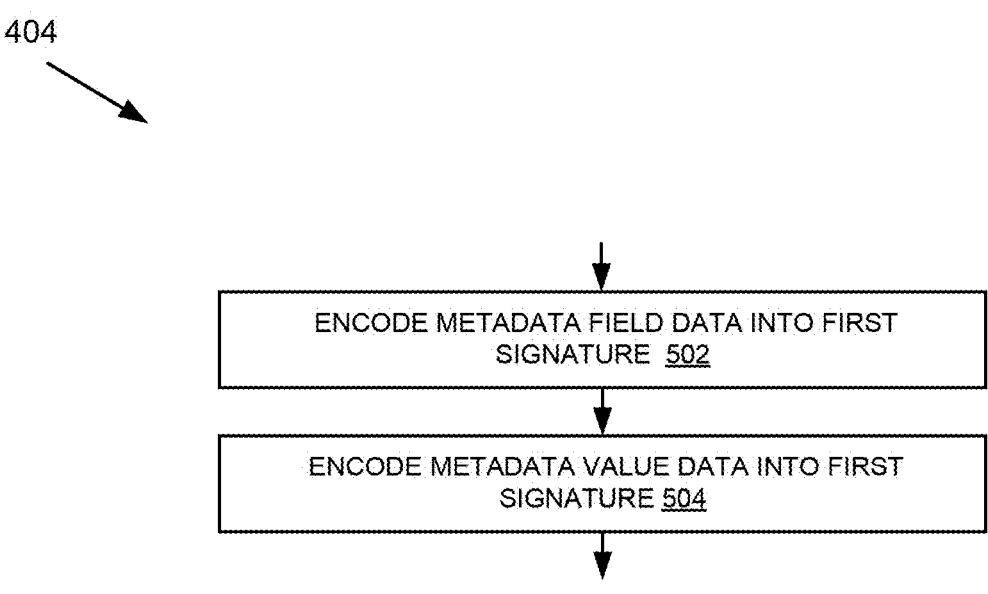
FIG. 5 is a flowchart of an example method for generating a metadata-encoded media signature in accordance with some implementations.

FIGS. 4-6 are flowcharts of example methods that may, in accordance with some implementations, be performed by the systems described above with reference to FIGS. 1-3. The methods 400-406 of FIGS. 4-6 are provided for illustrative purposes, and it should be understood that many variations exist and are within the scope of the disclosure herein. For example, while method 406 of FIG. 6 includes a series of determinations 602-612, the determinations may be performed in a different order or parallel. Additionally, depending on the implementation, some determinations may be omitted and/or different determinations performed without departing from the disclosure herein.

FIG. 4 is a flowchart of an example method 400 for metadata-based media authentication in accordance with some implementations. The method 400 begins at block 402. At block 402, the metadata extractor 324 extracts metadata associated with the first media. At block 404, the metadata-based signature encoder 326 generates one or more metadata-encoded media signatures based on the metadata extracted at block 402. At block 406, the signature analysis engine 328 determines, based on the one or more metadata-encoded media signatures, whether the first media is defect free and the method 400 ends.

FIG. 5 is a flowchart of an example method 404 for generating a metadata-encoded media signature in accordance with some implementations. The method 404 begins at block 502. At block 502, the metadata-based signature encoder 326 encodes metadata field data into a first metadata-encoded media signature. At block 504, the metadata-based signature encoder 326 encodes metadata value data into the first metadata-encoded media signature and the method 404 ends.

FIG. 6 is a flowchart of an example method 406 for analyzing a metadata-encoded media signatures in accordance with some implementations. The method 406 begins at block 602. At block 602, the intra-media analyzer 362 determines, based on a first metadata-encoded media signature in some implementations, value consistency in informationally overlapping metadata fields across different metadata sets associated with the first media. At block 604, the intra-media analyzer 362 determines whether sparse field in a first metadata-encoded media signature is indicative of synthetic generation. At block 606, the intra-media analyzer

362 and/or the cross-referencing engine 368 determines whether the field encoding in the first signature is consistent or indicates a defect. At block 608, the cross-referencing engine 368 determines whether the first signature is consistent with an origination signature of the purported source of the first media. At block 610, the intra-transaction analyzer 364 determines whether the first signature is consistent with a second signature associated with a second media received during the same transaction as the first media. At 612, the inter-transaction analyzer 366 determines whether the first signature is consistent with one or more signatures previously received and the method 406 ends.

Other Considerations

It should be understood that the above-described examples are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" or "some implementations" means that a particular feature, structure, or characteristic described in connection with the implementation is included in at least one implementation. The appearances of the phrase "in some implementations" in various places in the specification are not necessarily all referring to the same implementations.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web-Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As should be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies, engines, and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:

extracting, using one or more processors, metadata from a first media file, wherein the metadata is distinct from media content;

encoding, using the one or more processors, a first portion of the metadata extracted from the first media file into a first metadata-encoded media signature; and determining, using the one or more processors, whether the first metadata-encoded media signature is indicative of a defect including one or more of:

an intra-transaction analysis determining whether the first metadata-encoded media signature is consistent with a second metadata-encoded media signature associated with a second media file, wherein the first media file and second media file are associated with a common transaction; and an inter-transaction analysis determining whether the first metadata-encoded media signature is consistent with a third metadata-encoded media signature associated with a third media file, wherein the third media file is associate with a prior transaction.

2. The method of claim 1, wherein determining whether the first metadata-encoded media signature is indicative of the defect comprises an intra-media analysis including one or more of:

determining whether the first metadata-encoded media signature indicates an inconsistency between two or more metadata values, wherein each of the two or more metadata values are associated with a different set of metadata associated with the first media file but include an informational overlap; and determining whether the first metadata-encoded media signature indicates an absence of expected metadata.

3. The method of claim 2, wherein the different metadata sets include at least one from a group of: exchangeable image file format (EXIF) metadata, extensible metadata platform (XMP) metadata, International Press Telecommunications Council (IPTC) metadata, International Color Consortium (ICC) Profile metadata, comment metadata, and thumbnail metadata.

4. The method of claim 1, the method further comprising:
obtaining one or more of the second metadata-encoded media signature associated with the second media file and the third metadata-encoded media signature associated with the third media file.

5. The method of claim 1, wherein determining whether the first metadata-encoded media signature is indicative of the defect includes one or more of:
cross-referencing the first metadata-encoded media signature to determine whether the first metadata-encoded media signature is consistent with a representative signature generated via aggregation;
cross-referencing the first metadata-encoded media signature against one or more values within, or derived from, the media content; and
cross-referencing the first metadata-encoded media signature against source information.

6. The method of claim 1, wherein the first metadata-encoded media signature includes a vector representation, the first metadata-encoded media signature encoding one or more metadata fields that are present or absent from the metadata.

7. The method of claim 1, wherein the first metadata-encoded media signature includes encoded values associated with present metadata field.

8. The method of claim 1, wherein the encoding includes one or more of a weighted and proximity encoding.

9. The method of claim 1, wherein the media content is image-based and includes pixel data associated with one of at least one video frame and a still image.

10. The method of claim 1, wherein the first metadata-encoded media signature includes a graphical representation, the first metadata-encoded media signature encoding one or more metadata fields that are present or absent from the metadata.

11. A system comprising:
a processor; and
a memory, the memory storing instructions that, when executed by the processor, cause the system to:
extract metadata from a first media file, wherein the metadata is distinct from media content;
encode a first portion of the metadata extracted from the first media file into a first metadata-encoded media signature; and
determine whether the first metadata-encoded media signature is indicative of a defect including one or more of:
an intra-transaction analysis determining whether the first metadata-encoded media signature is consistent with a second metadata-encoded media signature associated with a second media file, wherein the first media file and second media file are associated with a common transaction; and
an inter-transaction analysis determining whether the first metadata-encoded media signature is consistent with a third metadata-encoded media signature associated with a third media file, wherein the third media file is associate with a prior transaction.

12. The system of claim 11, wherein determining whether the first metadata-encoded media signature is indicative of the defect comprises an intra-media analysis including one or more of:
determining whether the first metadata-encoded media signature indicates an inconsistency between two or more metadata values, wherein each of the two or more metadata values are associated with a different set of metadata associated with the first media file but include an informational overlap; and
determining whether the first metadata-encoded media signature indicates an absence of expected metadata.

13. The system of claim 12, wherein the different metadata sets include at least one from a group of: exchangeable image file format (EXIF) metadata, extensible metadata platform (XMP) metadata, International Press Telecommunications Council (IPTC) metadata, International Color Consortium (ICC) Profile metadata, comment metadata, and thumbnail metadata.

14. The system of claim 11, wherein the instruction, when executed, further cause the system to:
obtain one or more of the second metadata-encoded media signature associated with the second media file and the third metadata-encoded media signature associated with the third media file.

15. The system of claim 11, wherein determining whether the first metadata-encoded media signature is indicative of the defect includes one or more of:
cross-referencing the first metadata-encoded media signature to determine whether the first metadata-encoded media signature is consistent with a representative signature generated via aggregation;
cross-referencing the first metadata-encoded media signature against one or more values within, or derived from, the media content; and
cross-referencing the first metadata-encoded media signature against source information.

16. The system of claim 11, wherein the first metadata-encoded media signature includes a vector representation, the first metadata-encoded media signature encoding one or more metadata fields that are present or absent from the metadata.

17. The system of claim 11, wherein the first metadata-encoded media signature includes encoded values associated with present metadata field.

18. The system of claim 11, wherein the encoding includes one or more of a weighted and proximity encoding.

19. The system of claim 11, wherein the media content is image-based and includes pixel data associated with one of at least one video frame and a still image.

20. The system of claim 11, wherein the first metadata-encoded media signature includes a graphical representation, the first metadata-encoded media signature encoding one or more metadata fields that are present or absent from the metadata.

* * * * *